(12) United States Patent  (10) Patent No.: US 8,113,566 B2
Kruger  (45) Date of Patent: Feb. 14, 2012

(54) LOADING SPACE COVER

(75) Inventor: Mathias Kruger, Tubingen (DE)

(73) Assignee: Dr. Ing. h.c.F. Porsche, Aktiengesellschaft (DE)

( * ) Notice: Subject to any disclaimer, the term of this patent is extended or adjusted under 35 U.S.C. 154(b) by 184 days.

(21) Appl. No.: 12/696,447

(22) Filed: Jan. 29, 2010

(65) Prior Publication Data

US 2010/0194132 A1  Aug. 5, 2010

(30) Foreign Application Priority Data

Jan. 30, 2009  (DE) .......................... 10 2009 006 876

(51) Int. Cl.
*B60P 7/04* (2006.01)
(52) U.S. Cl. ................. 296/37.1; 296/37.16; 296/24.43; 296/98
(58) Field of Classification Search ............... 296/24.43, 296/24.44, 37.1, 37.8, 37.16, 100.01, 100.11, 296/100.13; 160/24, 238, 323.1, 370.21, 160/370.22; 292/7
See application file for complete search history.

(56) References Cited

U.S. PATENT DOCUMENTS

| | | | | |
|---|---|---|---|---|
| 4,932,704 A | * | 6/1990 | Ament | 296/37.16 |
| 5,538,306 A | * | 7/1996 | Ament | 296/37.1 |
| 5,618,077 A | * | 4/1997 | Ament et al. | 296/37.16 |
| 6,125,908 A | * | 10/2000 | Ament et al. | 160/323.1 |
| 6,390,526 B1 | * | 5/2002 | Ament et al. | 296/37.16 |
| 6,592,165 B2 | * | 7/2003 | Ament et al. | 296/37.16 |
| 7,014,239 B2 | * | 3/2006 | Ehrenberger | 296/37.1 |
| 7,048,319 B2 | * | 5/2006 | Ament et al. | 296/37.16 |
| 7,354,087 B2 | * | 4/2008 | Ehrenberger et al. | 296/24.43 |
| 7,628,437 B2 | * | 12/2009 | Zaiser et al. | 296/24.43 |
| 2002/0163220 A1 | * | 11/2002 | Ament et al. | 296/37.16 |
| 2006/0208518 A1 | * | 9/2006 | Ament et al. | 296/37.16 |
| 2010/0194132 A1 | * | 8/2010 | Kruger | 296/37.8 |

FOREIGN PATENT DOCUMENTS

DE 20 2006 018 470  3/2007
DE 10 2006 002 781  7/2007
DE 10 2006 008 222  8/2007

* cited by examiner

*Primary Examiner* — Glenn Dayoan
*Assistant Examiner* — Gregory Blankenship
(74) *Attorney, Agent, or Firm* — Gerald E. Hespos; Michael J. Porco

(57) ABSTRACT

A loading space cover having a dimensionally stable housing and a flexible sheet like screen is rolled up in the housing. Fastening devices are disposed at the longitudinal end sides of the loading space cover. Each fastening device can be held releasably in associated loading-space fasteners of a motor vehicle. The fastening devices are of structurally simple and cost-effective design. Additionally, in the event of a crash, the fastening devices are held reliably in the loading-space fasteners and permit an energy-absorbing twisting of the loading space cover about its longitudinal axis.

14 Claims, 4 Drawing Sheets

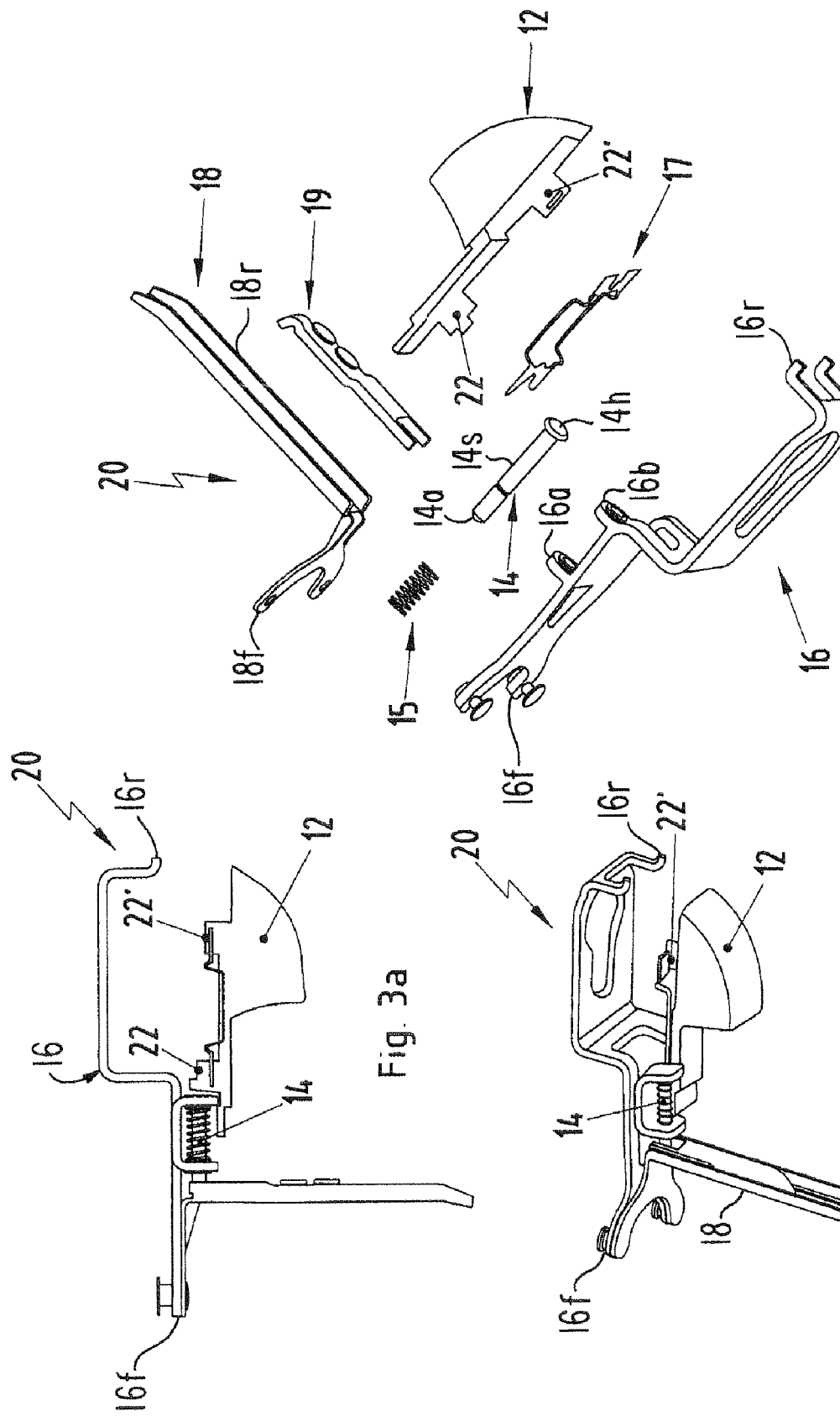

LOADING SPACE COVER

CROSS-REFERENCE TO RELATED APPLICATIONS

This application claims priority under 35 USC 119 to German Patent Application No. 10 2009 006 876.7 filed on Jan. 30, 2009, the entire disclosure of which is incorporated herein by reference.

BACKGROUND OF THE INVENTION

1. Field of the Invention

The invention relates to a loading space cover having a dimensionally stable housing in which a flexible sheetlike structure, such as a screen, is mounted so that it can be rolled up. The invention also relates to a motor vehicle fitted with a loading space cover of this type.

2. Description of the Related Art

DE 20 2006 018 470 U1 discloses a generic loading space cover for a motor vehicle. The loading space cover has a flexible sheetlike structure for restraining a load and a dimensionally stable housing unit that is held releasably in loading-space-side fasteners. Means are provided for moving the housing unit into a securing position, in which the housing unit is in positively locking engagement with the loading-space-side fasteners as a function of a tensile or bending load on the sheetlike structure. However, the means for moving the housing unit into a securing position is relatively complex and expensive. A load exerted on the sheetlike structure, for example in the event of an accident, moves the housing unit of the loading space cover positively into the securing position in which the housing unit is locked positively to the loading-space-side fasteners.

The load being transported in the loading space of a motor vehicle that has a relatively small loading space, such as a sports car, can press against the loading space cover in the event of an accident and can tear the loading space cover out of the loading-space-side anchoring points. In this case, both the load and the loading space cover are freely movable and unsecured. Load items flying around or a loading space cover that is flung around can pose an additional risk of injury in the event of a serious accident.

The invention therefore is concerned with a loading space cover that offers increased occupant protection in the event of an accident and that is cost-effective to produce.

SUMMARY OF THE INVENTION

The invention relates to anchoring a loading space cover in a loading space of a motor vehicle. The loading space cover is configured to rotate about its longitudinal axis, in the event of an accident, without being released from fasteners that are provided in the loading space of the vehicle. Thus, a load that slides forward during an accident or other sudden deceleration will cause the loading space cover to rotate about its longitudinal axis. The loading space cover has fastening devices that engage with the fasteners in the loading space. The fastening devices on the loading space cover are of extremely simple and therefore cost-effective design. The simple design is highly advantageous in a sports car because a sports car usually has only a very small loading space and therefore can transport only small loads. Such small loads may for example be drinks crates. The load, for example the drinks crate, will slide forward in the direction of the rear seat backrests in the event of a crash or other sudden deceleration of the motor vehicle. However, the load initially will be stopped by the loading space cover of the invention. The load continues to push forward if the deceleration during the crash is too great, and will cause the loading space cover to twist about its longitudinal axis. As a result, the load or the drinks crates are jammed simultaneously under the loading space cover. In this position, the retaining devices of the loading space cover keep the loading space cover fixedly connected to the fasteners of the loading space, and thereby fix the load that is pushing forward. Further deceleration causes the load to abut against a rear side of the rear seat backrest. As a result, the load is jammed in at three sides, specifically from above by the loading space cover, from the front by the rear side of the rear seat backrest, and from below by a floor of the loading space. Therefore the loading space cover of the invention considerably improves the occupant protection of a motor vehicle. A twisting of the cover about its longitudinal axis requires an expenditure of force so that impact energy also can be absorbed in this way.

The fastening devices at the longitudinal end sides of the loading space cover have an extremely simple yet effective locking mechanism with a bolt that is aligned in the vehicle longitudinal direction and that is preloaded into its locking position. The bolt can be unlocked counter to the spring force by means of an unlocking lever. The unlocked bolt permits an adjustment of the fastening device in the longitudinal direction of the loading space cover, which is transverse to the longitudinal direction of the vehicle. Thus, the fastening device of the loading space cover can be moved away from the adjacent side of the vehicle, toward the longitudinal center of the vehicle and out of engagement the fastener in the loading space of the vehicle. By contrast, in the locked state, the bolt blocks the axial adjusting movement of the fastening device and thereby fixes the loading space cover in the fastener provided in the loading space of the vehicle. The safety-promoting loading space cover is therefore cost-effective to produce and can be used at least in motor vehicles in the mid-range price sector.

The locking mechanism preferably has at least an end plate, a helical spring, a bracket, a locking bolt, an unlocking lever, a leaf spring and a base holder. The entire fastening device therefore can be composed, in the best case, of only seven individual components. As a result, the fastening device generally makes do with a small number of parts and can be produced with expedient storage and logistical costs for the individual components. The components of the fastening device can be assembled in a simple cost-effective manner. It is also conceivable for the assembly of the fastening devices to be carried out by a supplier so that the fastening device can be delivered pre-assembled for the production of the loading space cover. It is of course also conceivable for the entire loading space cover to be provided as a finished part by a supplier so that the assembly of the loading space cover can be sourced out to the supplier.

Further important features and advantages of the invention emerge from the claims, the drawings and from the associated description of the figures on the basis of the drawings.

It is self-evident that the features specified above and the features yet to be explained below can be used not only in the respectively specified combination but also in other combinations or individually without departing from the scope of the present invention.

Preferred exemplary embodiments of the invention are illustrated in the drawings and are explained in more detail in the following description, with the same reference numerals relating to identical or similar or functionally identical components.

BRIEF DESCRIPTION OF THE DRAWINGS

FIG. 3a is a top plan view of a locking mechanism of the fastening device and FIG. 3b is a perspective view of the locking mechanism of the fastening device.

FIG. 4 is an exploded perspective view of the locking mechanism according to the invention.

DETAILED DESCRIPTION OF THE PREFERRED EMBODIMENT

Figure 1B:
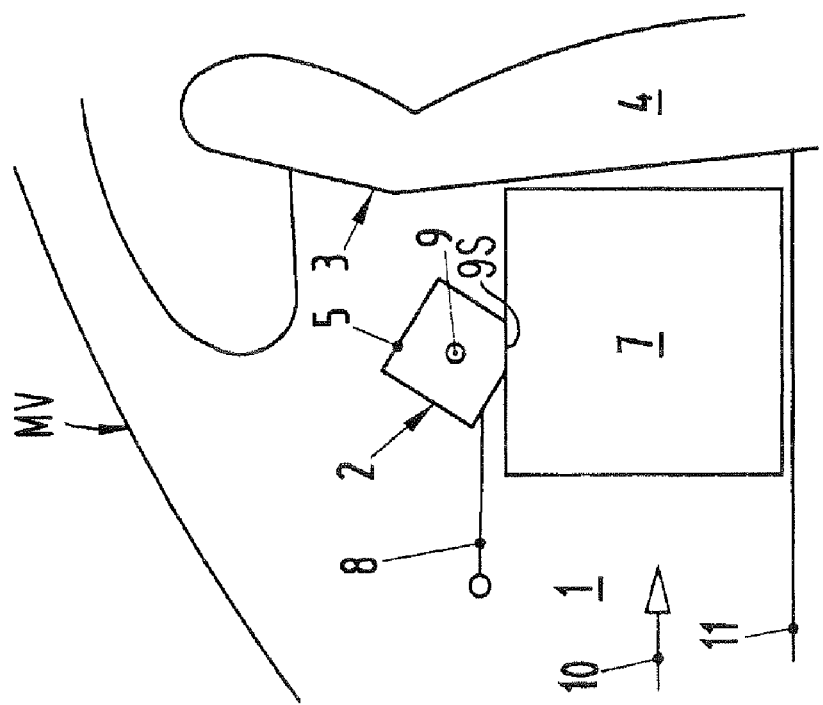
FIG. 1b is a schematic side elevational view similar to FIG. 1a, but with a load having been displaced on account of a crash.
Figure 1A:
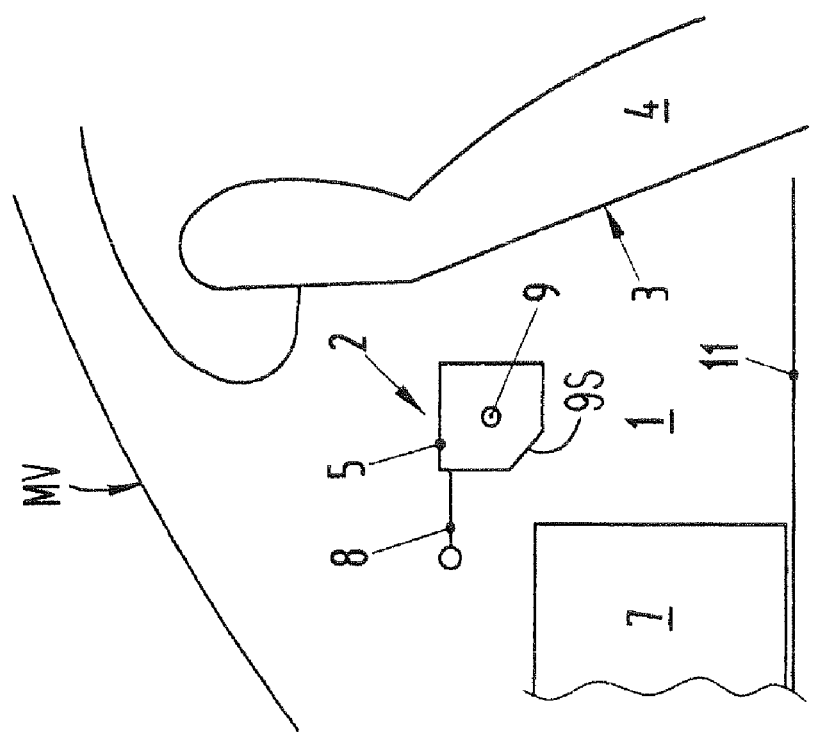
FIG. 1a is a schematic side elevational view of a loading space of a motor vehicle having a loading space cover according to the invention.
Figure 1C:
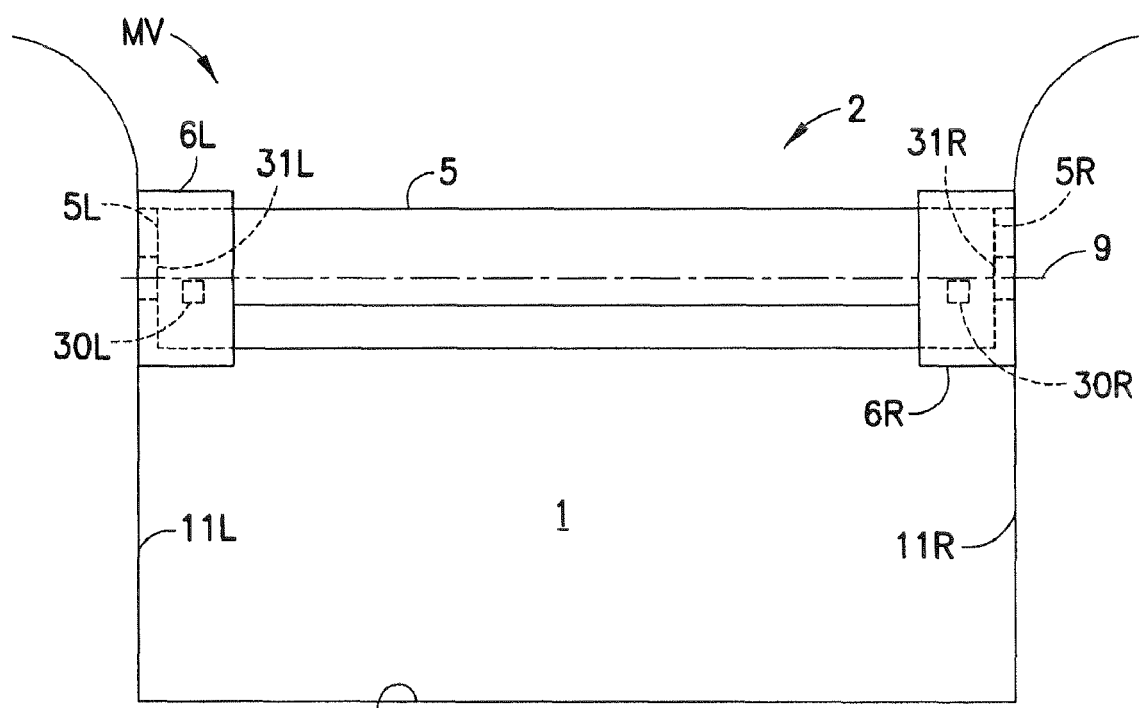
FIG. 1c is a schematic rear elevational view of the loading space and the loading space cover.
Figure 2:
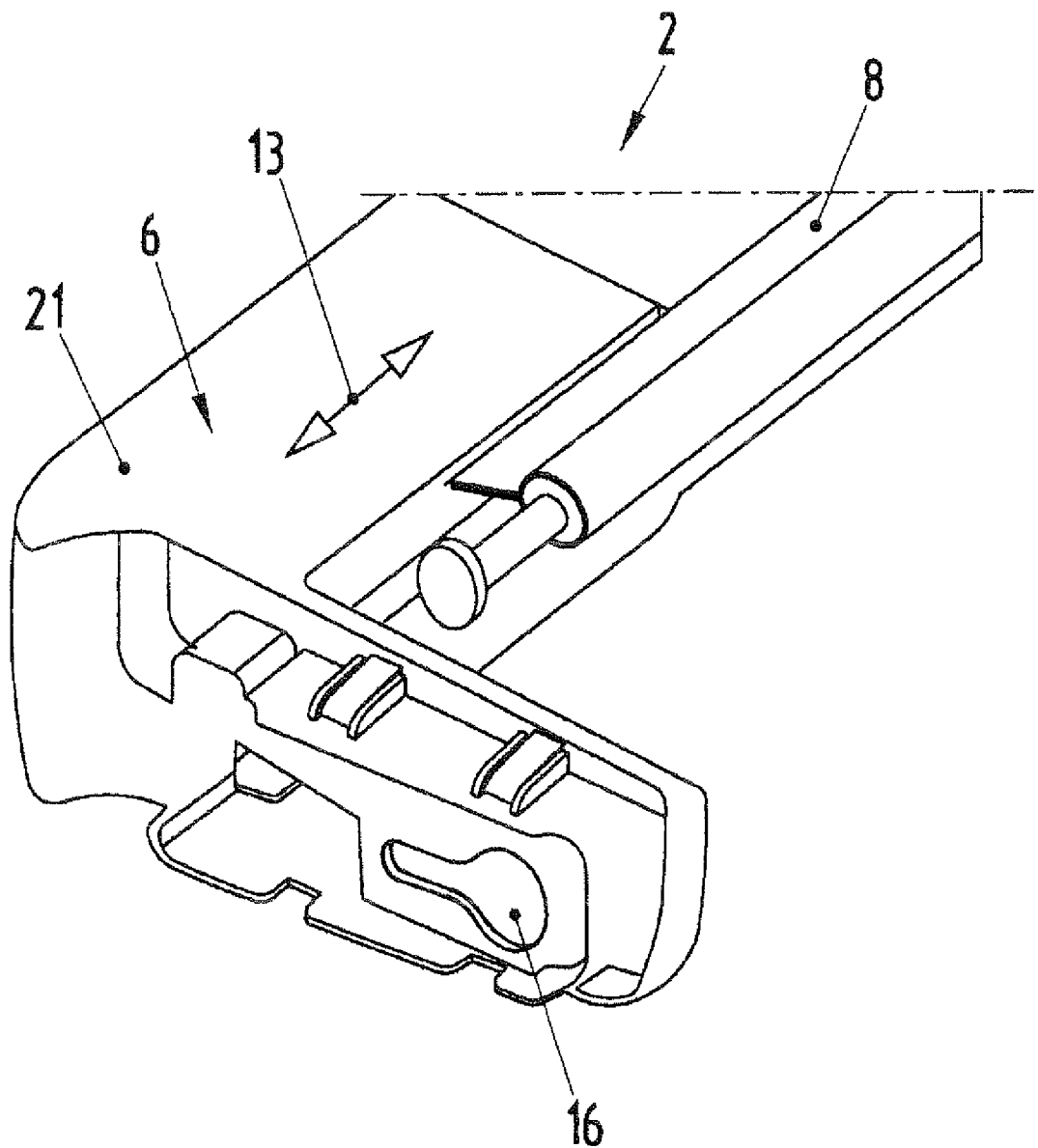
FIG. 2 shows a view of a loading space cover according to the invention in the region of a lateral fastening device.

A loading space of a motor vehicle MV is identified generally by the numeral 1 in FIGS. 1a and 1b. The loading space 1 is defined partly by a loading space floor 11 and opposite left and right sides 11L and 11R, as shown in FIG. 1c. The loading space 1 has a loading space cover 2, which is shown at a distance from a rear side 3 of a backrest 4 of a passenger seat of the motor vehicle MV. However, the loading space cover 2 can directly adjoin the rear side 3 of the rear seat backrest 4. The loading space cover 2 has a dimensionally stable housing 5 with opposite longitudinal ends 5L and 5R spaced from one another in the transverse direction of the vehicle and hence near the left and right sides of the motor vehicle MV. Fastening devices 6L and 6R are arranged at the longitudinal ends 5L, 5R of the housing 5 of the loading space cover 2, as shown in FIGS. 1c and 2 to 4 and can be moved selectively toward and away from each other between retracted positions where the spacing between the fastening devices 6L and 6R is a minimum and extended positions where the spacing between the fastening devices 6L and 6R is a maximum. Locking apertures 30L and 30R preferably are provided in the housing 5 near the respective ends 5L and 5R of the housing 5 and cooperate with the fastening devices 6L and 6R as explained below for selectively locking the fastening devices 6L and 6R in the extended positions relative to the housing 5. The fastening devices 6L, 6R can connect the loading space cover 2 to loading-space-side fasteners 31L and 31R provided respectively at the lateral sides 11L and 11R of the loading space 1 of the motor vehicle MV when the fastening devices 6L and 6R are in the extended positions. Thus, the fastening devices 6L, 6R and the loading-space-side fasteners 31L and 31R have complimentary mating shapes, such as apertures on the fastening devices 6L, 6R and projections on the loading-space-side fasteners 31L, 31R. The fastening devices 6L and 6R are spaced inwardly from the loading-space-side fasteners 31L and 31R when the fastening devices 6L and 6R are in the retracted positions so that the loading space cover 2 can be removed from the loading space 1.

The loading space cover 2 has an extendable flexible sheet 8 in the form of a load-securing net that can be extended from the housing 5 along the longitudinal direction 10 of the motor vehicle MV for covering the loading space 1 and a load 7 stowed therein.

The loading space cover 2 is designed so that, in the event of a crash, the loading space cover 2 is held reliably in the fasteners 31L, 31R provided at lateral sides 11L, 11R of the loading space 1 of the motor vehicle MV and also permits an energy-absorbing twisting movement about the longitudinal axis 9 of the loading space cover 2 (the transverse direction of the motor vehicle MV), as is illustrated in FIGS. 1b and 1c. Therefore, in the event of an accident, the load 7 is shifted forward in the longitudinal direction of travel 10 toward the rear 3 of the seat backrest 4, with the load 7, depending on its height, sliding at least partly under the loading space cover 2 and twisting the loading space cover 2. Twisting movement of the loading space cover 2 is facilitated by providing the housing 5 with an oblique surface 5s that is aligned substantially parallel to the longitudinal axis 9 of the loading space cover 2 and at an acute angle to the loading space floor 11. The twisting of the loading space cover 2 takes place under a deformation force, and therefore with an absorption of energy. An end of the shifting movement of the load 7 is defined by the point at which the load 7 becomes jammed by the loading space cover 2, the rear 3 of the rear seat backrest 4 and the loading space floor 11. The load 7 thus is jammed on three sides and no longer is capable of sliding uncontrolled through the loading space 1, and particularly over the head end of the rear seat backrest 4 and into a passenger compartment. At the same time, the loading space cover 2 has the effect that, despite a deformation, specifically a twisting movement about its longitudinal axis 9, the loading space cover 2 is held securely in the fasteners provided at lateral sides 11L, 11R of the loading space 1 of the motor vehicle MV and thereby cannot be flung around, uncontrolled, in the loading space 1 or in a passenger compartment situated in front in the direction of travel 10.

Increased occupant safety of the loading space cover 2 is only one point of the invention. A second important point is to keep the fastening devices 6L, 6R extremely simple. At least one of the fastening devices 6L, 6R at the longitudinal ends of the housing 5 of the loading space cover 2 can be adjusted relative to the housing 5 in the longitudinal direction 13 of the loading space cover 2, which is transverse to the longitudinal direction 10 of the motor vehicle MV. The adjustment and movement of at least one of the fastening devices 6L, 6R is achieved by actuating a corresponding unlocking lever 12, as shown in FIGS. 3 and 4, so that the respective fastening device 6L or 6R can be moved to the retracted positions relative to the housing 5 and released from the corresponding loading-space-side fasteners 31L or 31R provided respectively at the lateral sides 11L and 11R of the loading space 1 of the motor vehicle MV.

The unlocking lever 12 interacts with a preloaded and spring-biased bolt 14, as shown in FIGS. 3a, 3b and 4. The bolt 14 has a leading end 14a, a head 14h opposite the leading end 14a and a shank 14s extending between the leading end 14a and the head 14h. The bolt 14 is preloaded by a helical spring 15 into a locking position where the leading end 14a of the bolt 14 engages in the corresponding aperture 30L or 30R of the housing 5 to lock the respective fastening device 6L or 6R in the extended position and to prevent a movement of the fastening device 6L or 6R inwardly in the direction 13 and toward the retracted position. Thus, the fastening devices 6L and 6R remain engaged with the respective loading-space-side fasteners 31L, 31R and the loading space cover 2 cannot be removed from the loading space 1 of the motor vehicle MV when the bolt 14 is biased by the helical spring 15 into its locking state. The unlocking lever 12 is connected operatively to the bolt 14, as shown in FIGS. 3a and 3b and merely needs to be urged manually parallel to the bolt 14 and counter to the spring preload provided by the helical spring 15 to disengage the leading end 14a of the bolt 14 from the aperture 30L or 30R. The fastening device 6 then can be moved in the longitudinal direction 13 of the loading space cover 2 to the retracted position and away from the fastener 31L, 31R at the respective lateral side 11L, 11R of the loading space 1 of the motor vehicle MV to remove the loading space cover 2.

The unlocking lever 12, the bolt 14 and the helical spring 15, an end plate 16, a leaf spring 17, a bracket 18 and a base holder 19 form the significant constituent parts of a locking mechanism 20 arranged in a housing 21 of the fastening device 6. Both the housing 21 and the unlocking lever 12 may be designed cost-effectively as plastic injection-molded parts. The bracket 18, the base holder 19, the end plate 16 and the bolt 14, preferably are formed from metal, such as steel, for reliably absorbing or transmitting the high forces that occur in the event of a crash.

The end plate 16 has opposite front and rear ends 16f and 16r. The C-shaped structure at the front end 16f of the end plate 16 is mounted in the housing 21 of the fastening device 6L, 6R to be substantially concentric with the rotational axis about which the flexible sheet 8 is wound. The keyhole shaped opening near the rear end 16r of the end plate 16 is configured to engage with the respective loading-space-side fasteners 31L, 31R in the sides 11L, 11R of the loading space 1 of the motor vehicle MV when the fastening devices 6L and 6R are in the extended positions relative to the housing 5 of the loading space cover 2. The end plate 16 is formed with spaced apart parallel flanges 16a and 16b, each of which has an aperture dimensioned to slidably accommodate the shank 14s of the bolt 14, while preventing the head 14h of the bolt 14 from passing therethrough. The flanges 16a and 16b are spaced from one another by a distance that preferably is less than the unbiased length of the helical spring 15. The shank 14s of the bolt 14 includes an undercut that can be engaged with one end of the helical spring 15. Thus, the helical spring 15 biases the bolt 14 into a position where the leading end 14a of the bolt 14 projects a maximum distance beyond the flange 16a. As a result, the leading end 14a of the bolt 14 engages in the respective aperture 30L, 30R of the housing 5 for holding the fastening device 6L or 6R in the extended position and preventing the fastening device 6L or 6R from being separated from the respective loading-space-side fasteners 31L, 31R in the sides 11L, 11R of the loading space 1 of the motor vehicle MV.

The bracket 18 is substantially L-shaped and has a C-shaped leg 18f that substantially registers with the C-shaped front end 16f of the end plate 16. The bracket 18 also has a reinforcing leg 18r that extends substantially parallel to the axis about which the sheet 8 is wound. The reinforcing leg 18r of the bracket has a substantially U-shaped cross-section and the base holder 19 is engaged in the channel defined by the U-shaped cross-section of the reinforcing leg 18r.

The leaf spring 17 is braced between two supports 22 and 22' formed on the unlocking lever 12, as shown in FIGS. 3 and 4, and functions primarily to stabilize the unlocking lever 12, which is formed from plastic.

The unlocking lever 12 is connected operatively to the head 14h of the bolt 14. Thus, the bolt 14 can be released from the aperture 30L or 30R of the housing 5 of the loading space cover 2 by exerting sufficient manual pressure on the unlocking lever 12 (rightward in FIGS. 3a and 3b) to overcoming the biasing force of the helical spring 15. As a result, the bolt 14 is moved into a position that enables the respective fastening device 6L or 6R to be moved into the retracted position. Accordingly, the fastening device 6L or 6R can be separated from the respective loading-space-side fasteners 31L, 31R in the sides 11L, 11R of the loading space 1 of the motor vehicle MV, and the loading space cover 2 can be removed from the loading space 1. The helical spring 15 will return the bolt 14 automatically to the position for engaging the aperture 30L or 30R upon release of the manual forces on the unlocking lever 12.

The loading space cover 2 provides an increased level of occupant protection in the event of a crash, and this increased level of occupant protection is realized in a cost-effective manner by the structurally simple fastening device 6 and the fastening device 6 of the locking mechanism 20.

What is claimed is:

1. A loading space cover for selectively covering a loading space of a motor vehicle, the motor vehicle having opposite front and rear ends spaced apart along a vehicle longitudinal direction of the motor vehicle and opposite first and second transverse sides, the loading space cover comprising:
   a dimensionally stable housing with first and second longitudinal ends in proximity to the respective first and second transverse sides of the motor vehicle;
   a flexible sheet rolled up in the housing;
   first and second fastening devices in proximity to the respective first and second longitudinal ends of the housing, the first and second fastening devices being configured for releasably engaging respective first and second loading-space fasteners of the motor vehicle for releasably holding the loading space cover, at least one of the fastening devices being movable relative to the housing toward and away from the other of the fastening devices and having a locking mechanism with a bolt aligned in the vehicle longitudinal direction, a spring preloading the bolt into a locking position where the bolt blocks movement of the fastening device away from the loading space fastener for fixing the loading space cover in the fastener, an unlocking lever disposed for moving the bolt counter to forces exerted by the spring and into an unlocked state that permits movement of the fastening device in the longitudinal direction of the loading space cover and away from the loading-space fastener.

2. The loading space cover of claim 1, wherein the fastening devices are configured so that, in the event of a crash, the fastening devices are held reliably in the loading-space fasteners and permit an energy-absorbing twisting of the loading space cover about its longitudinal axis.

3. The loading space cover of claim 2, wherein the housing of the loading space cover has a rearward and downwardly facing wall for engaging a load in the loading space and generating the energy-absorbing twisting of the housing in the event of a crash.

4. The loading space cover of claim 1, wherein the locking mechanism includes an end plate that slidably engages the bolt, a helical spring being mounted on the bolt and being disposed for biasing the bolt into a position for engaging a locking structure on the housing.

5. The loading space cover of claim 4, further comprising an unlocking lever engaged with the bolt so that movement of the unlocking lever moves the bolt out of engagement with the locking structure on the housing so that the respective fastening device can be moved relative to the housing.

6. The loading space cover of claim 5, wherein the unlocking lever is formed from plastic.

7. The loading space cover of claim 4, characterized in that the end plate and the bolt are formed from metal.

8. The loading space cover of claim 4, wherein the locking mechanism is arranged in a plastic housing.

9. A motor vehicle comprising:
   a loading space having opposite first and second side walls and loading-space-side fasteners in the respective side walls; and a loading space cover having a dimensionally stable housing with first and second longitudinal ends in proximity to the respective first and second side walls of the motor vehicle, a flexible sheet rolled up in the housing, first and second fastening devices mounted to the respective first and second longitudinal ends of the housing for movement toward and away from one another between retracted and extended positions, the first and second fastening devices being configured for releasably engaging the respective first and second loading-space-side fasteners of the motor vehicle when the fastening devices are in the extended positions, each of the fastening devices having a locking mechanism with a bolt aligned in a vehicle longitudinal direction, a spring preloading the bolt into a locking position where the bolt blocks movement of the fastening device to the retracted position for fixing the loading space cover in the loading-space-side fastener, an unlocking lever disposed for moving the bolt counter to forces exerted by the spring and into an unlocked state that permits movement of the fastening device in the longitudinal direction of the loading space cover to the retracted position and away from the respective loading-space-side fastener.

10. The motor vehicle of claim 9, wherein the fastening devices are configured so that, in the event of a crash, the fastening devices are held reliably in the loading-space fasteners and permit an energy-absorbing twisting of the loading space cover about its longitudinal axis.

11. The motor vehicle of claim 10, wherein the housing of the loading space cover has a rearward and downwardly facing wall for engaging a load in the loading space and generating the energy-absorbing twisting of the housing in the event of a crash.

12. The motor vehicle of claim 11, wherein the locking mechanism includes an end plate that slidably engages the bolt, a helical spring being mounted on the bolt and being disposed for biasing the bolt into a position for engaging a locking structure on the housing.

13. The motor vehicle of claim 12, further comprising an unlocking lever engaged with the bolt so that movement of the unlocking lever moves the bolt out of engagement with the locking structure on the housing so that the respective fastening device can be moved relative to the housing.

14. The motor vehicle of claim 13, wherein the locking mechanism is arranged in a plastic housing.

* * * * *